United States Patent
Mashima et al.

(10) Patent No.: US 7,415,593 B2
(45) Date of Patent: Aug. 19, 2008

(54) STORAGE CONTROL SYSTEM

(75) Inventors: Takao Mashima, Fujisawa (JP); Dai Taninaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 369 days.

(21) Appl. No.: 11/070,247

(22) Filed: Mar. 3, 2005

(65) Prior Publication Data

US 2006/0143422 A1 Jun. 29, 2006

(30) Foreign Application Priority Data

Dec. 24, 2004 (JP) ............................. 2004-374682

(51) Int. Cl.
*G06F 9/35* (2006.01)
(52) U.S. Cl. ..................... 711/203; 711/112
(58) Field of Classification Search ................. 711/203, 711/112

See application file for complete search history.

(56) References Cited

U.S. PATENT DOCUMENTS 6,457,109 B1 9/2002 Milillo et al.

2003/0221074 A1 11/2003 Satoyama et al.

FOREIGN PATENT DOCUMENTS

| EP | 1357465 A2 | 10/2003 |
|---|---|---|
| EP | 1357476 A2 | 10/2003 |
| JP | 09-288547 | 11/1997 |
| JP | 2001-337850 | 12/2001 |
| WO | 97/09676 | 3/1997 |
| WO | 03014910 | 2/2003 |
| WO | 03090087 | 10/2003 |

*Primary Examiner*—Hyung Sough
*Assistant Examiner*—Kenneth M Lo
(74) *Attorney, Agent, or Firm*—Mattingly, Stanger, Malur & Brundidge, P.C.

(57) ABSTRACT

A storage control system having no risk of changing the storage content of a logical volume by a data update to a virtual logical volume. A logical volume, which is not correspondent to a virtual logical volume, can be specified when defining a virtual logical volume correspondent to a logical volume. A first storage controller comprises a port capable of connecting to both a logical volume of the first storage controller, and a logical volume of a second storage controller; a virtual logical volume, which is set in association with a logical volume connected to this port; and a virtual logical volume-setting controller for controlling the setting of a virtual logical volume. The virtual logical volume-setting controller is constituted such that the virtual logical volume cannot be set in a logical volume of the first storage controller.

11 Claims, 14 Drawing Sheets

| VDEV | EXTERNAL DEVICE INFORMATION ||||||
| | DEVICE IDENTIFICATION INFORMATION | CAPACITY (KB) | DEVICE TYPE | PATH INFORMATION ||
| | | | | WWN | LUN |
| --- | --- | --- | --- | --- | --- |
| 0 | DRFGTFNEIEK | 657,456 | DISK | 0xAABBCCDD | 0 |
| 1 | ADRFGTFNEIE | 89,854 | DISK | 0xAABBEEFF | 3 |
| 2 | GGRRFFDDERT | · | TAPE | 0x445566AAB | 5 |
| 3 | AABBCCDDEE | 5,544,223 | DISK | 0x77DE12345 | 6 |
| | | | | 0x77DE12345 | 3 |
| | | | | 0x377DE7890 | 5 |

ALTERNATE PATH (last three rows of VDEV 3 path information)

FIG.11

| COPY PAIR MANAGEMENT TABLE |||
|---|---|---|
| COPY ORIGIN LU | COPY DESTINATION LU | PAIR STATE |
| LU#1 | LU#11 | PAIR FORMATION |
| LU#2 | LU#12 | PAIR PARTITION |
| ... | ... | ... |

STORAGE CONTROL SYSTEM

CROSS-REFERENCES TO RELATED APPLICATIONS

This application relates to and claims priority from Japanese Patent Application No. 2004-374682, filed on Dec. 24, 2004, the entire disclosure of which is incorporated herein by reference.

BACKGROUND OF THE INVENTION

1. Field of the Invention

The present invention relates to a storage control system comprising a storage controller, which is connected to a host computer, and which carries out the communication of storage data with this host computer.

2. Description of the Related Art

In a database system that handles large amounts of data, such as a data center, for example, data is managed by using a storage control system constituted independently of a host computer. This storage control system, for example, is constituted comprising a disk array device. The disk array device is constituted by arranging a plurality of storage devices into an array, and is built, for example, on the basis of RAID (Redundant Array of Independent Inexpensive Disks). A logical volume, which is at the least one or more logical storage areas, is formed on a physical storage area provided by the group of storage devices, and this logical volume is provided to the host computer serving as a host (more specifically, to a database program running on the host computer). The host computer can write and read data to and from the logical volume by sending predetermined commands.

As the information society advances, the data managed by databases will increase daily. For this reason, higher performance, larger capacity storage controllers are required, and new storage controllers are being developed to meet the needs of this market. There are two methods for incorporating a new storage controller into a storage control system. The first is a method whereby an old storage controller is completely replaced by a new storage controller, and a storage system is constituted from all new storage controllers (Japanese Patent KOHYO Publication No. H10-508967). The other method is one whereby a new storage controller is added to a storage system comprising old storage controllers, and the old and new storage controllers are used together.

Further, technology for managing the storage area of a physical device in sector units, and for dynamically configuring a logical device in sector units is also well known (Japanese Patent KOKAI Publication No. 2001-337850). In addition, when building a logical device from a plurality of storage devices having different capacities, technology for forming an area in accordance with the storage device having the least capacity, and for forming an area in accordance with the smallest capacity of the remaining capacities is also known (Japanese Patent KOKAI Publication No. H9-288547).

SUMMARY OF THE INVENTION

It has been proposed that the performance of a storage control system be improved by externally connecting a second storage controller to a storage controller. In this case, the first storage controller can treat the storage area of the second storage controller as if it were its own storage area by associating the storage area of the second storage controller to the storage area of the first storage controller. Thus, when a separate second storage controller is externally connected to the first storage controller, in order to make the storage area of the first storage controller correspond to the storage area of the second storage controller, a new storage area (virtual logical volume) is virtually established in the first storage area. This makes it possible to exchange data between the storage area of the first storage controller and the storage area of the second storage controller via the virtual logical volume. However, in this case, trouble occurs when the virtual logical volume becomes correspondent to the logical volume of the storage area possessed by the first storage controller. That is, the problem is that the host becomes able to recognize both the real logical volume of the first storage controller and the virtual logical volume correspondent thereto, and when there is a data update to the virtual logical volume, this affects the real logical volume, and the data content of the real logical volume is updated despite the fact that there was no data update to the real logical volume.

Further, when data is exchanged between the logical volume of the first storage controller and the logical volume of the second storage controller, for example, when copying is implemented, the problem is that the storage area of the second storage controller is directly connected to the storage area of the first storage controller, and when an attempt is made to physically copy data without going through the host, copying cannot be performed due to the difference between the storage capacity possessed by the logical volume and the emulation type (the logical configuration type of the logical volume) determined by the block length of a block, which is a data management unit.

The development of storage controllers can also be traced back to those designed for use with mainframes, and mainframe architectures have been adapted to open system connections as well. For this reason, technologies that have evolved for connecting storage controllers to mainframes have been converted for connecting storage controllers to open system environment hosts as well. Therefore, mainframe emulation has been replicated in open system environments. Thus, the logical volume emulation type of a mainframe system storage controller remains as-is even in the storage controller of an open system environment. Consequently, the problem is that the movement of data between logical volumes having different emulation types cannot be carried out even when it becomes necessary to replace old devices with new ones.

With the foregoing problems in view, an object of the present invention is to provide a storage control system in which a data update to a virtual logical volume [can be carried out] without the risk of changing the storage contents of a logical volume. A further object of the present invention is to provide a storage control system that makes it possible to copy data between storage areas having different emulation types without going through a host.

A first invention for achieving the above-mentioned object is one characterized in that it is a storage control system and storage control method constituted such that a logical volume, which is not correspondent to a virtual logical volume, can be specified when defining a virtual logical volume correspondent to a logical volume. A first aspect of the present invention is a storage control system, which is constituted by connecting a first storage controller and a second storage controller to enable them to communicate with one another, and which carries out data processing in response to a request from a host, [this storage control system] being characterized in that the above-mentioned first storage controller comprises a storage device; a logical volume accessible from the above-mentioned host; a data controller for controlling data processing between the above-mentioned storage device and the above-mentioned logical volume; a port capable of connecting to both the above-mentioned logical volume of the above-mentioned first storage controller, and a logical volume of the above-mentioned second storage controller; a virtual logical volume, which is set in association with the logical volume connected to this port; and a virtual logical volume-setting controller for controlling the setting of this virtual logical volume, and the above-mentioned virtual logical volume-setting controller is constituted such that it is possible to specify the above-mentioned logical volume, in which the above-mentioned corresponding virtual logical volume cannot be set.

A preferred aspect of the present invention is as follows. The above-mentioned virtual logical volume-setting controller is constituted such that it cannot set the above-mentioned virtual logical volume in a logical volume of the above-mentioned first storage controller. The above-mentioned virtual logical volume-setting controller is constituted such that it can set the above-mentioned virtual logical volume in a logical volume of the above-mentioned second storage controller.

Further, the above-mentioned virtual logical volume-setting controller is constituted so as to execute a discovery process for extracting the above-mentioned logical volumes capable of being connected to the above-mentioned port as a group of candidates for the above-mentioned virtual logical volume, and a filtering process for removing a logical volume of the above-mentioned first storage controller from this group of candidates.

The above-mentioned virtual logical volume-setting controller, based on the results of filtering [obtained via] the above-mentioned filtering process, operates so as to display on a display screen the above-mentioned logical volumes constituting the group of candidates for the above-mentioned virtual logical volume. The above-mentioned virtual logical volume-setting controller is constituted so as not to display a logical volume of the above-mentioned first storage controller on the above-mentioned display screen as a group of candidates to be made correspondent to the above-mentioned virtual logical volume. The above-mentioned virtual logical volume-setting controller comprises a management program of a client computer that connects to the above-mentioned data controller, and is constituted such that the above-mentioned filtering process and the above-mentioned discovery process are achieved by this program. It comprises a switch for selectively connecting the above-mentioned logical volumes of the above-mentioned first storage controller and the above-mentioned logical volumes of the above-mentioned second storage controller to the above-mentioned ports. The above-mentioned virtual logical volume-setting controller is constituted so as to be able to disable the above-mentioned filtering process.

A second aspect of the present invention is a storage control system, which is constituted by connecting a first storage controller to a second storage controller so that they are able to communicate with one another, and which carries out data processing in response to a request from a host, [this storage control system] being characterized in that the above-mentioned first storage controller comprises a storage device; a logical volume accessible from the above-mentioned host; a data controller for controlling data processing between the above-mentioned storage device and the above-mentioned logical volume; a port capable of connecting to both the above-mentioned logical volume of the above-mentioned first storage controller, and a logical volume of the above-mentioned second storage controller; and a discovery controller for extracting information of logical volumes connected to this port, and executing a discovery operation for displaying extraction results on a screen, and this discovery controller is constituted so as to be able to carry out processing such that a predetermined logical volume from among the extracted logical volumes is not displayed on the screen.

A second invention for achieving the above-mentioned object is characterized in that it is a system, which is constituted so as to enable copying among a plurality of logical volumes having different logical configuration types to be [carried out] via a virtual logical volume, which is virtually set inside a storage controller, and which is an intermediate logical storage hierarchy.

A first aspect of this invention is a storage control system, which is constituted by connecting a first storage controller to a second storage controller so that they are able to communicate with one another, and which carries out data processing in response to a request from a host, [this storage control system] being characterized in that the above-mentioned first storage controller is constituted comprising a storage device; a logical volume accessible from the above-mentioned host; and a data controller for controlling data processing between the above-mentioned storage device and the above-mentioned logical volume, and the above-mentioned data control portion is constituted so as to execute copying between a logical volume of the above-mentioned first storage controller and an other logical volume having a logical configuration that differs from the logical configuration of this logical volume, by way of a virtual logical volume built inside the above-mentioned first storage controller.

A preferred aspect of this invention is as follows. The above-mentioned logical volume belongs to the above-mentioned first storage controller. The above-mentioned other logical volume belongs to the above-mentioned second storage controller. The logical volume of the above-mentioned first storage controller constitutes the copy volume, the above-mentioned other logical volume constitutes the copy source volume, and the above-mentioned virtual logical volume is defined by a logical configuration that is the same as the logical configuration of the copy destination volume.

A second aspect of the above-mentioned invention is a storage control system, which is constituted by connecting a first storage controller to a second storage controller so that they are able to communicate with one another, and which carries out data processing in response to a request from a host, [this storage control system] being characterized in that the above-mentioned first storage controller comprises a storage device; a logical volume accessible from the above-mentioned host; a data controller for controlling data processing between the above-mentioned storage device and the above-mentioned logical volume; a port capable of connecting to both the above-mentioned logical volume of the above-mentioned first storage controller, and a logical volume of the above-mentioned second storage controller; and a virtual logical volume, which is set in association with the logical volumes connected to this port, and the above-mentioned data control portion is constituted so as to execute copying between a logical volume of the above-mentioned first storage controller connected to the above-mentioned port and an other logical volume inside this first storage controller, having a logical configuration that differs from the logical configuration of this logical volume, by way of the above-mentioned virtual logical volume, and the logical configuration of this virtual logical volume is set in accordance with the logical configuration of the above-mentioned other logical volume.

As explained hereinabove, according to the present invention, it is possible to provide a storage control system, for which there is no danger of a data update to a virtual logical volume changing the storage content of a logical volume. Further, it is also possible to provide a storage control system capable of enabling the copying of data between storage areas having different logical storage area emulation types, without going through a host.

BRIEF DESCRIPTION OF THE DRAWINGS

FIG. 4 is a schematic diagram showing an overview of a mapping table;

FIG. 11 is a diagram showing one example of a local copy management table;

DESCRIPTION OF THE PREFERRED EMBODIMENTS

The embodiments of the present invention will be explained hereinbelow. In a typical storage control system explained hereinbelow, a logical storage area is virtually established in a first storage controller, a logical storage area of a second storage controller, which exists outside the first storage controller, is made correspondent (mapped) to this virtual area, the first storage controller treats the storage area of the second storage controller just like its own storage area, and this [storage control system] is provided to a host.

Figure 1:
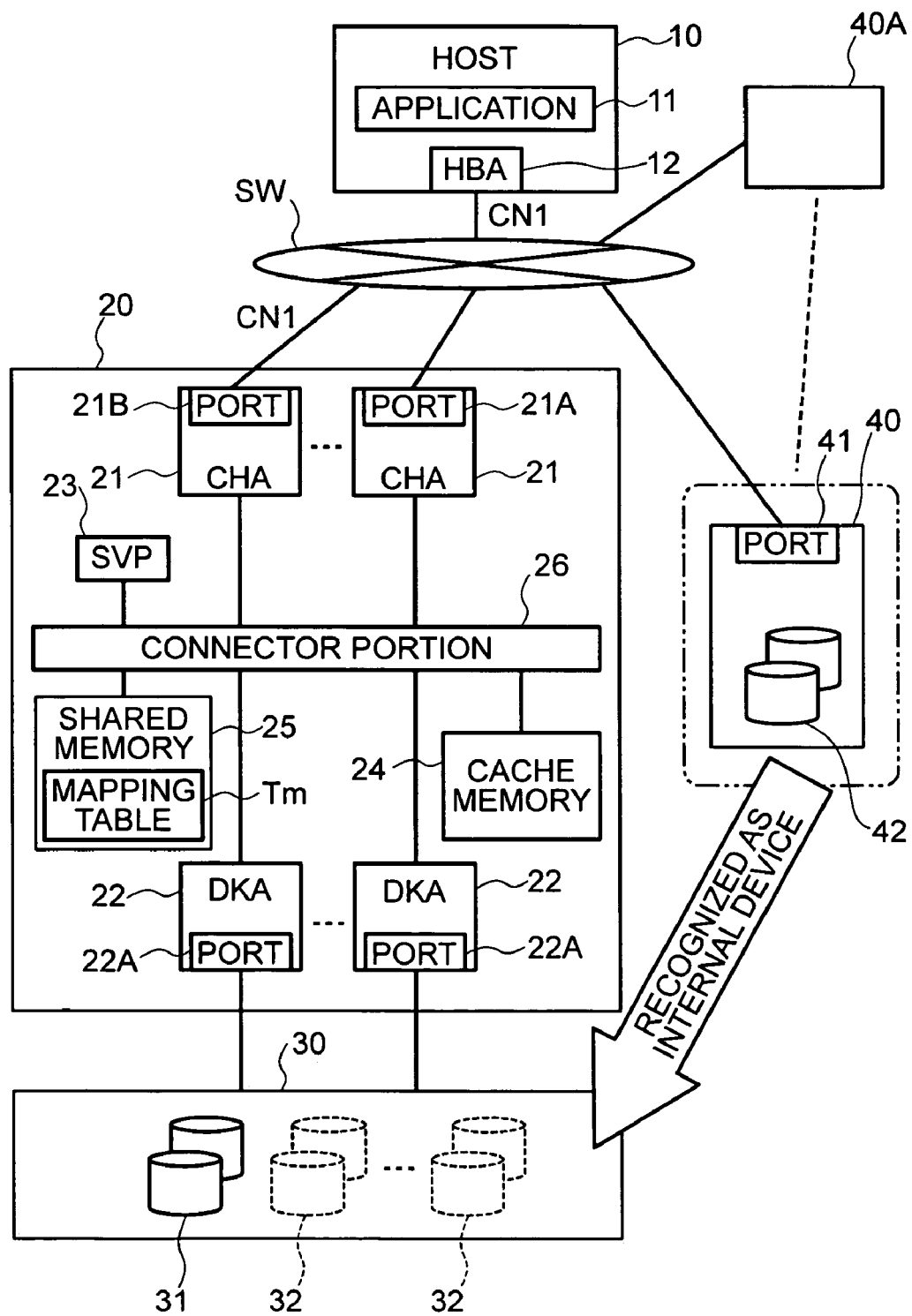
FIG. 1 is a block diagram showing the overall constitution of a storage system related to an embodiment of the present invention.

FIG. 1 is a block diagram showing the constitution of the essential elements of a storage control system. The host 10, which [serves] as the host, is a computer device comprising a CPU (Central Processing Unit), memory and other such information processing resources, and comprises, for example, a personal computer, workstation, mainframe computer or the like. The host 10 comprises an information inputting device (not shown in the figure), such as, for example, a keyboard, switch, pointing device, or microphone, and an information outputting device (not shown in the figure), such as, for example, a monitor display or speakers. In addition, the host 10 will also be provided with database software or other such application programs 11, which utilize a storage area provided by a first storage controller 20, and an adapter 12 for accessing the first storage controller 20 via a communications network CN1.

The host 10 is connected to the first storage controller 20 by way of the communications network CN1, which is constituted comprising a switch SW. As the communications network CN1, for example, a LAN, SAN, the Internet, a leased line, or a public switched network can be used as the occasion demands. Data communications via a LAN, for example, are carried out according to TCP/IP (Transmission Control Protocol/Internet Protocol). When the host 10 is connected to the first storage controller 20 by way of a LAN, the host 10 specifies a file name, and requests input/output in file units. By contrast, when the host 10 is connected to the first storage controller 20 by way of a SAN, the host 10 adheres to the fibre channel protocol, and requests data input/output in units called blocks, which are the data management units of a storage area provided by a plurality of disk storage devices (disk drives). When the communications network CN1 is a LAN, the adapter 12, for example, is a LAN network card. When the communications network CN1 is a SAN, the adapter 12, for example, is a host bus adapter.

The switch SW is constituted comprising a router or exchange connected to a communications network. The switch SW is constituted so as to be able to switch the target port 41 of the second storage controller 40 and the target port 21B of the first storage controller to the external port 21A of the first storage controller 20. Furthermore, the first storage controller 20 falls into the so-called self-looping type in order to be constituted so as to be able to connect to its own target port 21B via the external port 21A and switch SW. Network addresses are set in each port and switch SW.

The first storage controller 20, for example, is constituted as a disk array system. However, it is not limited thereto, and it is also possible to constitute the first storage controller 20 as a high-functionality, intelligent fibre channel switch. As will be explained hereinbelow, because the first storage controller 20 provides the storage resources possessed by the second storage controller 40 to the host 10 as its own logical volume (Logical Unit), there is no need for it to have local storage devices that it directly controls on its own without going through a virtual logical volume described hereinbelow.

The first storage controller 20 can be broadly divided into a controller portion and a storage device portion, and the controller portion comprises a plurality of channel adapters (CHA) 21, a plurality of disk adapters (DKA) 22, a service processor (SVP) 23, cache memory 24, shared memory 25, and a connector portion 26. This controller portion corresponds to the data controller of the Claims.

A channel adapter (CHA) 21 carries out data communications with the host 10. Another channel adapter 21 carries out data communications with an internal logical volume of the second storage controller 40 via the external port 21A of the first storage controller 20 and the target port 41 of the second storage controller. The channel adapters 21 are constituted as microcomputer systems each comprising a microprocessor, memory and so forth, and interpret and execute a variety of commands received from the host 10. Since a network address (for example, an IP address or WWN) is allocated to each channel adapter 21 for identifying each one respectively, the channel adapters 21 are constituted such that each can behave as an independent NAS (Network Attached Storage).

When a plurality of hosts 10 exists, the respective channel adapters 21 are provided to each host 10, and are constituted so as to be able to accept requests from each host 10 independently.

The disk adapters (DKA) 22 carry out data reception between the storage devices 31, 32 of a storage apparatus 30. Each disk adapter 22 comprises a communications port 22A for connecting to the storage devices 31, 32. Further, each disk adapter 22 is constituted as a microcomputer system comprising a microprocessor, memory and so forth. The disk adapters 22 write data, which channel adapters 21 received from the host 10, to predetermined addresses of predetermined storage devices 31, 32 on the basis of a request (write command) from the host 10, and read out data from predetermined addresses of predetermined storage devices 31, 32 on the basis of a request (read command) from the host 10, and send it to the host 10. When data input/output is carried out between the storage devices 31, 32, the disk adapters 22 convert logical addresses to physical addresses. The disk adapters 22 carry out data access according to a RAID configuration when the storage devices 31, 32 are managed according to RAID.

The service processor (SVP) 23 controls the overall operation of the device. A management client (not shown in the figure) is connected to the SVP 23. The SVP 23 is constituted so as to monitor for the occurrence of an internal malfunction, display it on the management client, and give instructions for the blocking of a storage disk based on commands from the management client. In addition, the management client of the SVP 23, as will be explained hereinbelow, executes processing for defining a virtual logical volume. The management client, for example, is configured to run a JAVA™ applet management program.

Cache memory 24 temporarily stores data received from the host computer 10, and data read out from the storage devices 31, 32. Control information for use in operating the first storage controller is stored in shared memory 25. Further, a working area is set, and a mapping table Tm and various other types of tables to be explained hereinbelow are also stored in shared memory 25. Further, cache memory 24 and shared memory 25 can also be constituted as separate memories, and one portion of the storage area of the same memory can be used as a cache area, and the other storage area can be used a control area. Furthermore, either one or a plurality of the storage devices 31, 32 can also be used as cache disks.

The connector portion 26 is mutually connected to the channel adapters 21, disk adapters 22, SVP 23, cache memory 24, and shared memory 25. The connector portion 26, for example, can be constituted as a highspeed bus, such as an ultra-highspeed crossbar switch for transmitting data by virtue of highspeed switching operations.

The storage apparatus 30 comprises a plurality of storage devices 31. As storage devices 31, for example, it is possible to use devices such as hard disks, flexible disks, magnetic tapes, semiconductor memory, or optical disks. Further, it is also possible, for example, to include different types of disks inside the storage apparatus 30, such as FC (Fibre Channel) disks and SATA (Serial AT Attachment) disks. A storage device 32 indicated by a dotted line inside the storage apparatus 30 is indicative of a state in which a storage device 42 belonging to the second storage controller 40 is incorporated in the first storage controller 20. That is, the constitution is such that a storage device 42, which exist externally as seen from the first storage controller 20, can be recognized as an internal storage device of the first storage controller 20, providing the host 10 with the storage resources of an external storage device 42. As will be explained hereinbelow, this is possible by mapping a logical volume of the second storage controller 40 to a virtual logical volume, which is an intermediate logical storage area inside the first storage controller 20. The virtual logical volume is built using the storage space of cache memory 24. A virtual logical volume formed in the first storage controller 20 is detected by the host 10 together with a real logical volume inside the first storage controller 20.

The second storage controller 40 comprises a communications port (target port) 41 and a storage device 42. In addition, it can also comprise a channel adapter and disk adapter. The second storage controller 40 is connected to the first storage controller 20 by way of the switch SW, and the constitution is such that a storage device 42 of the second storage controller 40 is treated as an internal storage device of the first storage controller 20. A plurality of external storage controllers 40A can be connected to the switch SW.

Figure 2:
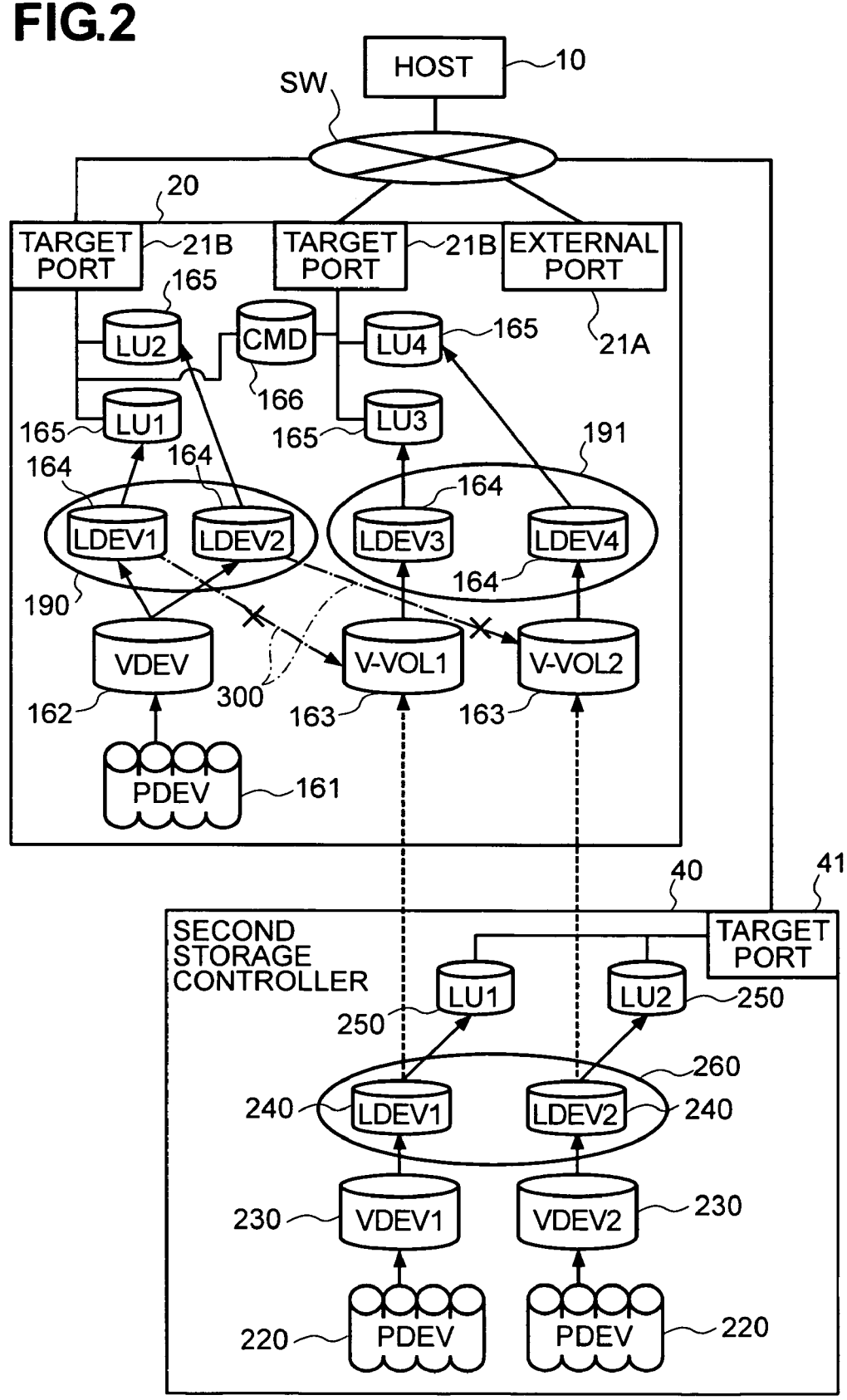
FIG. 2 is a schematic view showing an overview of a logical configuration of a storage system.

Next, FIG. 2 will be explained. FIG. 2 is a schematic view showing an overview of one logical configuration of the first storage controller 20 and the second storage controller 40. The constitution of the first storage controller 20 will be explaned first.

The storage structure of the first storage controller 20, for example, can be broadly divided into a physical storage hierarchy and a logical storage hierarchy. The physical storage hierarchy is constituted from PDEV (Physical Devices) 161, which are physical disks. The PDEV correspond to disk drives.

The logical storage hierarchy can be constituted from a plurality (for example, two types) of hierarchies. One logical hierarchy can be constituted from VDEV (Virtual Devices) 162 and virtual VDEV (also called V-VOL hereinbelow) 163, which are treated like VDEV 162. The other logical hierarchy can be constituted from LDEV (Logical Devices) 164.

The VDEV 162, for example, are constituted by grouping a predetermined number of PDEV 161 into groups of four (3D+1P) or eight (7D+1P). One RAID storage area is formed by aggregating the storage areas provided by each PDEV 161 belonging to a group. This RAID storage area constitutes VDEV 162.

In contrast to the fact that VDEV 162 are built on a physical storage area, V-VOL 163 are virtual intermediate storage devices that do not require a physical storage area. The V-VOL 163 exists virtually to serve as a recipient for mapping LU (Logical Units) 250 of the second storage controller 41 without establishing a direct relationship with the physical storage area.

At the least one or more of the LDEV 164 can be disposed on either the VDEV 162 or V-VOL 163. The LDEV 164, for example, can be constituted by dividing the VDEV 162 into fixed lengths. When the host 10 is an open system environment host, the host 10 recognizes the LDEV 164 as one physical disk by mapping the LDEV 164 to the LU 165. An open system environment host accesses a desired LDEV 164 by specifying a LUN (Logical Unit Number) or a logical block address. Furthermore, when the host is a mainframe system, it directly recognizes the LDEV 164.

The LU 165 is a device capable of being recognized as an SCSI logical unit. Each LU 165 is connected to the host 10 by way of a target port 21B. Each LU 165 can be associated with at the least one or more LDEV 164, respectively. The LU size can be virtually expanded by associating a plurality of LDEV 164 to one LU 165.

The CMD (Command Device) 166 is a dedicated LU used for transferring commands and status between an I/O control program running on the host 10 and the controllers (CHA 21, DKA 22) of the storage controller 20 (Refer to FIG. 1). A command from the host 10 is written to the CMD 166. The storage controller 20 executes processing according to the command written into the CMD 166, and the results of this execution are written to the CMD 166 as a status. The host 10 reads out and confirms the status written into the CMD 166, and writes the contents of the processing to be executed next into the CMD 166. In this way, the host 10 can provide a variety of instructions to the storage controller 20 via the CMD 166.

Furthermore, a command received from the host 10 can be processed without storing it in the CMD 166. Further, [the present invention] can also be constituted such that a CMD is generated as a virtual device without defining a real device (LU), and receives and processes a command from the host 10. That is, for example, the CHA 21 writes the command received from the host 10 into shared memory 25, and the command stored in this shared memory 25 is processed by either CHA 21 or DKA 22. The results of this processing are written to shared memory 25, and sent from the CHA 21 to the host 10.

Now then, as explained hereinabove, the target port 41 of the second storage controller 40 and the target port 21B of the first storage controller 20 can be connected via the switch SW to the external port (External Port) 21A for externally connecting the first storage controller 20.

The second storage controller 40 comprises a plurality of PDEV 220, VDEV 230 established on the storage area provided by the PDEV 220, and LDEV 240 at the least one or more of which can be set on the VDEV 230. LDEV 240 are associated with the respective LU 250.

Also, in the present embodiment, LU 250 (that is, LDEV 240) of the second storage controller 40 is mapped to a virtual logical volume V-VOL 163, which is the virtual intermediate storage device, and treated as an internal logical volume of the first storage controller 20.

For example, "LDEV1", "LDEV2" of the second storage controller 40 are respectively mapped to "V-VOL1", "V-VOL2" of the first storage controller 20 by way of "LU1", "LU2". Then, "V-VOL1", "V-VOL2" are respectively mapped to "LDEV3", "LDEV4" such that they become capable of being used by way of "LU3", "LU4".

Furthermore, VDEV 162, V-VOL 163 can be adapted to a RAID configuration. That is, one disk drive 161 can be allocated to a plurality of [virtual devices] VDEV 162, V-VOL 163 (slicing), and one [virtual device] VDEV 162, V-VOL 163 can also be formed from a plurality of disk drives 161 (striping).

Then, either "LDEV1" or "LDEV2" of the first storage controller 20 corresponds to an internal logical volume 190. Either "LDEV3" or "LDEV4" of the first storage controller 20 corresponds to a virtual logical volume 191. Either "LDEV1" or "LDEV2" of the second storage controller 40 corresponds to an external logical volume 260. The internal logical volume 190 is provided on the basis of a physical storage device (for example, a disk drive or the like), which is disposed inside the first storage controller 20. The virtual volume 191 exists virtually, and the real [storage volume] for storing the data exists inside the second storage controller 40. That is, the virtual logical volume 191 is built by mapping the external volume 260 belonging to the second storage controller 40 to a predetermined layer of the storage hierarchy of the first storage controller 20.

Referring to FIG. 1, the CHA 21 of the first storage controller 20 recognizes a volume capable of being referenced via the external port 21A as an external device, and the above-described virtual logical volume mapped to this external storage device is defined inside the first storage controller 20. This definition operation, for example, is executed by a JAVA™ applet, which is the SVP 23 management client described hereinabove. This definition information is stored in shared memory 25 as a mapping table Tm. However, as indicated by reference numeral 300 of FIG. 2, a virtual logical volume cannot be mapped to the internal logical volume 190 of the first storage controller 20.

Figure 3:
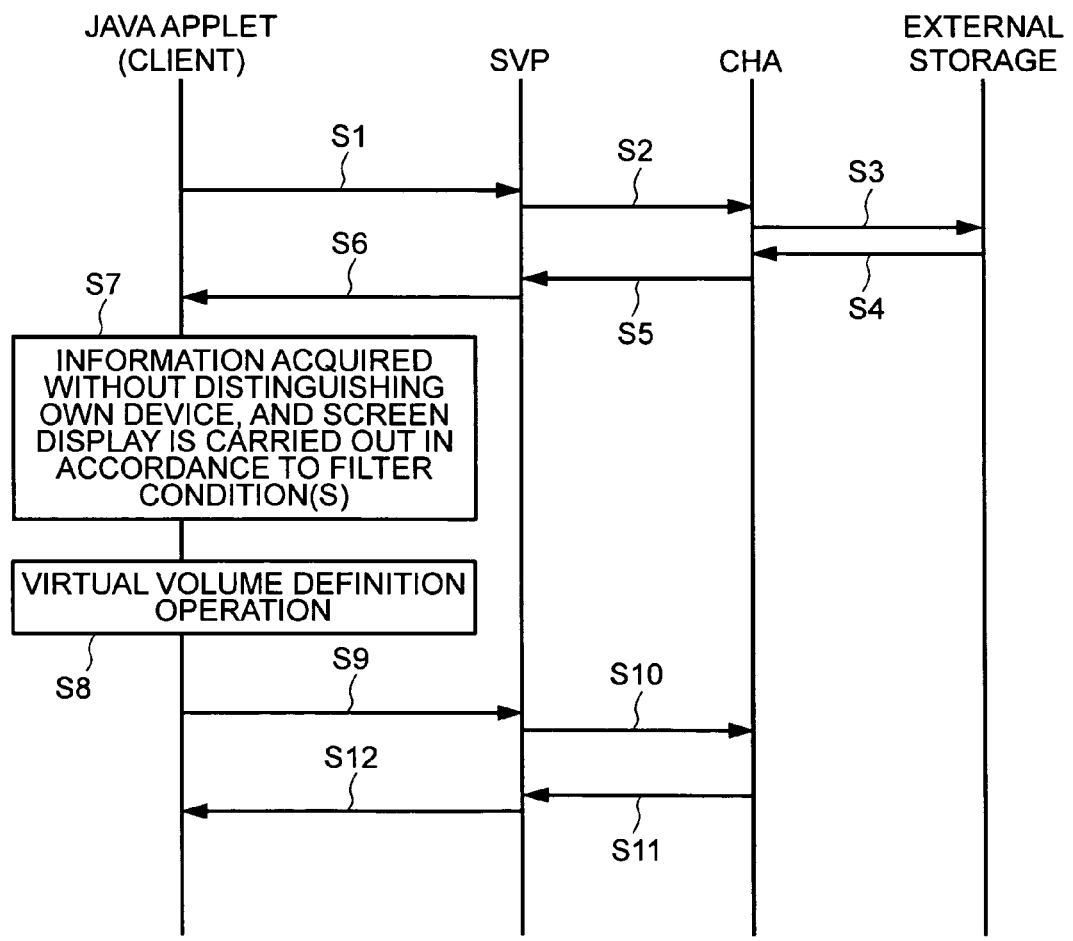
FIG. 3 is a schematic showing the flow of operations for establishing a virtual logical volume.

Next, the operation for setting a virtual logical volume in the first storage controller 20 will be explained. FIG. 3 shows the flow of this setting operation. The management client JAVA™applet requests the SVP to acquire internal logical volume information (discovery) capable of being referenced from external port 21A (FIG. 1) (S1). Upon receiving this request, the SVP issues a command to the CHA 21 of the first storage controller 20 (FIG. 1) to execute discovery (S2). The CHA references shared memory 25, obtains the IP address of the switch SW, accesses the switch SW by way of the external port 21A, and acquires the information of all the volumes capable of being referenced from this switch. In other words, the CHA executes discovery for internal logical volumes capable of connecting to the external port 21A without distinguishing between its own internal logical volumes and the internal logical volumes of the other storage controller (S3). As shown in FIG. 1, the volumes that the CHA 21 can reference via the switch SW connected to the external port 21A are the logical volumes of the first storage controller 20 and the logical volumes of the second storage controller 40.

Next, the CHA 21 of the first storage controller 20 and the CHA (not shown in the figure) of the second storage controller 40 reference their respective shared memories, and acquire attribute data of their respective internal logical volumes (S4). Upon receiving this attribute data, CHA 21 sends the attribute data to the management client JAVA™ applet via the SVP 32 (S5, S6). A storage management application for determining, based on the information in the attribute data, such as the "storage vendor name, product name, production number" and so forth, whether the device to which an extracted internal logical volume belongs is the storage controller that incorporates the CHA 21 or an external storage controller, is implemented on the JAVA™ applet for each of the plurality of internal logical volumes referenced by the discovery.

This management application comprises a module for carrying out filtering for the plurality of internal logical volumes extracted by the discovery [to determine] which is a good candidate for the above-described virtual logical volume. The management application uses this filtering module to filter the extracted information related to the plurality of logical volumes (S7), and displays those logical volumes that satisfy the conditions as a group of candidates for mapping a virtual logical volume.

In this embodiment, as described hereinabove, the management application is programmed such that a internal logical volume of the first storage controller 20 is not displayed as a candidate volume for mapping a virtual volume. Next, the management client requests the SVP to execute definition processing for a virtual logical volume (S8, S9). The SVP has the CHA execute virtual logical volume definition processing, that is, a processing operation for creating the above-mentioned mapping table (S10), and upon receiving the results of this processing, sends these results to the management client (S11, S12). Since an internal logical volume of the management client user's own controller (the first storage controller 20) is not displayed as a mapping destination for a virtual logical volume inside his own controller, a virtual logical volume cannot be set for an internal logical volume of the user's own controller. Therefore, it is possible to avoid the problem whereby a data update request to the virtual logical volume from the host 10 affects the real logical volume, and the data content of the real logical volume is updated despite the fact there was no data update [request] to the real logical volume. Furthermore, the virtual logical volume-setting controller of the Claims is realized in accordance with the SVP and management client. A CHA or DKA processor can also achieve this setting control process.

Furthermore, the filtering condition can be changed according to circumstances by the management client. Also, the management client can cancel the filtering condition, and display all the discovery-extracted logical volumes to which paths are formed via the external port of the first storage controller.

Discovery can be executed whenever it is deemed suitable, such as when the power is turned ON to the first storage controller, when the host accesses the first storage controller, or at a predetermined time. The logical volume information obtained as a result of discovery is stored in shared memory each time discovery [is executed]. From the standpoint of the efficient utilization of shared memory storage resources, a software module for clearing past discovery information and executing discovery once again exists in the management client. By comparing characteristic logical volume information obtained as a result of discovery against reference information stored in shared memory, the management client can make a determination as to whether it is a volume of its own controller or one of another controller (the second storage controller).

Figure 13:
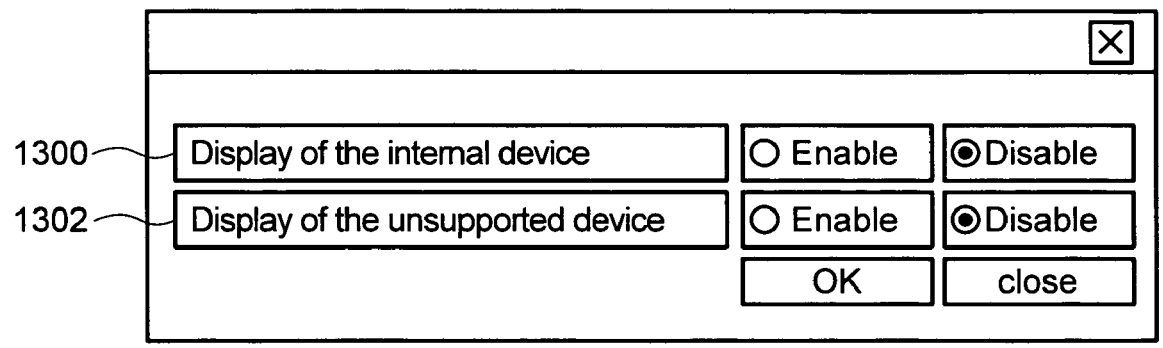
FIG. 13 is one example of a management screen displayed be a management tool of a management client.

Furthermore, FIG. 13 is a screen that is displayed by a management tool of the management client, and is the filter setting screen. Reference numeral 1300 is the icon for setting a mode in which one's own logical volume is not displayed as a setting destination of a virtual volume subsequent to discovery. Furthermore, reference numeral 1302 is the icon for setting a mode in which an internal logical volume of a storage controller not supported by the manufacturer of the first storage controller is not displayed. Thus, a user can use the management tool [to set modes] so that an internal logical volume of a specified condition cannot be displayed.

Next, definition processing of a virtual logical volume will be explained in detail. FIG. 4 is one example of the structure of the above-mentioned mapping table Tm. A mapping table Tm, for example, can be constituted by making the VDEV numbers for identifying the respective VDEV correspondent to the information of external storage devices. External device information can be constituted comprising, for example, device identification information, storage device storage capacity, information indicating the type of a device (for example, a tape system device or a disk system device), and information on the path to a storage device. Further, path information can be constituted comprising identification information (WWN) peculiar to each communications port (21A, 21B of FIG. 1), and the LU numbers for identifying the LU of FIG. 2.

Furthermore, the device identification information and WWN in FIG. 4 are values used for the sake of explanation, and as such, have no particular significance. Further, the VDEV of the VDEV number "3" shown in the bottom portion of FIG. 4 has been made correspondent to the information of three paths. That is, an external storage device (42 of FIG. 1) mapped to this VDEV (#3) comprises alternate path structures having three routes to the inside thereof, but mapping to the VDEV is performed by recognizing these alternate path structures. Since it is clear that the same storage area can be accessed no matter which of these three routes is taken, even if one or two of these routes is blocked, desired data can still be accessed via the remaining normal route. By using a mapping table Tm such as that shown in FIG. 4, the mapping of one or a plurality of storage devices can be carried out to one or more VDEV inside the first storage controller 20.

Figure 5:
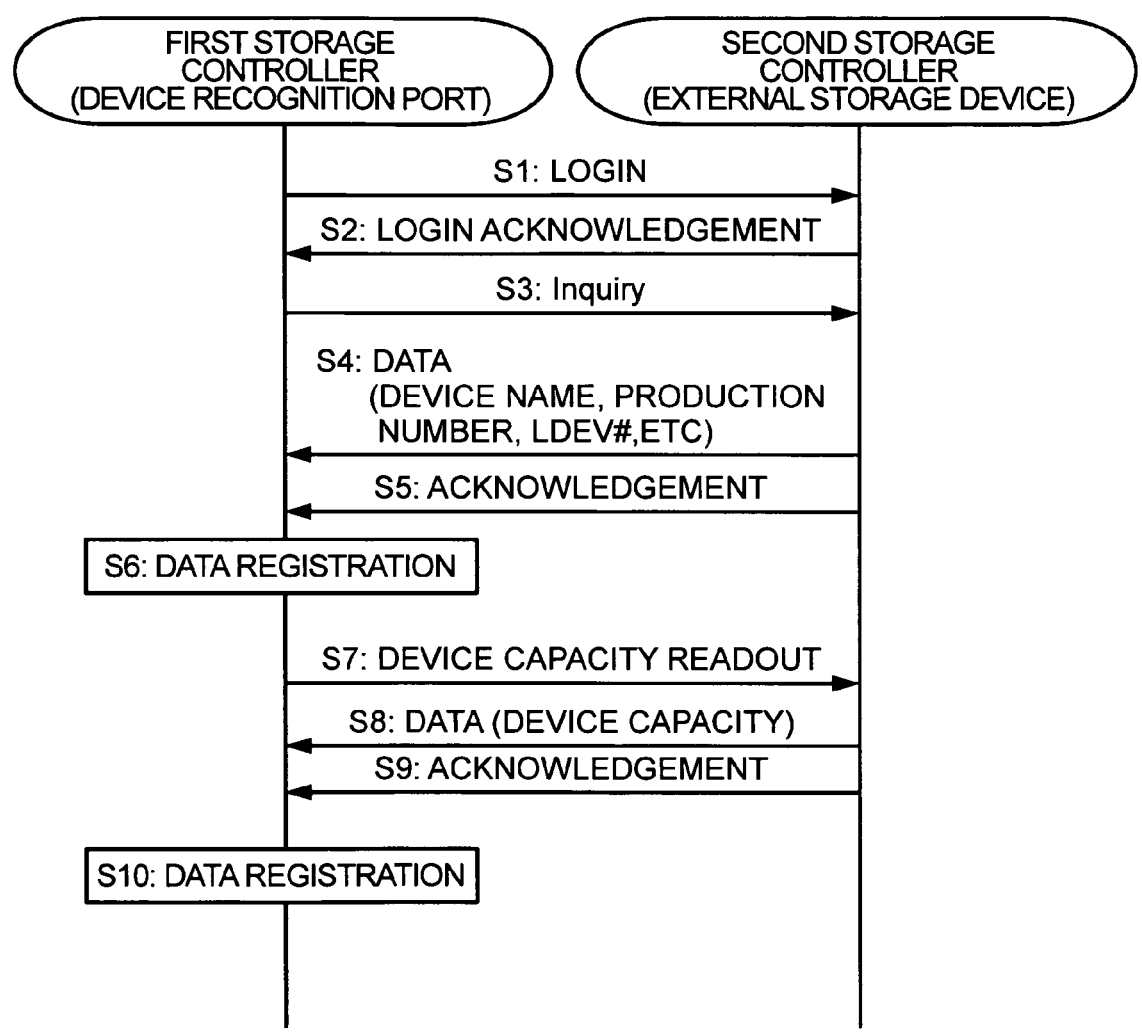
FIG. 5 is a schematic showing the flow of processing for building a mapping table.

Next, one example of a method for mapping an external storage device 42 to a VDEV 101 will be explained by referring to FIG. 5. FIG. 5 is a time chart showing the essential elements of processing carried out between the first storage controller 20 and the second storage controller 40 during mapping. Firstly, the first storage controller 20 logs in to the second storage controller 40 by way of the switch SW from the external port (21A) of the channel adapter 21 (S1). The second storage controller 40 completes the login by returning an acknowledgement to the login of the first storage controller 20 (S2). Next, the first storage controller 20, for example, sends an inquiry command stipulated by the SCSI (Small Computer System Interface) standard to the second storage controller 40 requesting a response regarding the details of the storage device 42 possessed by the second storage controller 40 (S3). This is the same as the operation of the above-described discovery.

The inquiry command is utilized to clarify the type and constitution of the device being inquired, and is capable of penetrating the hierarchy of the inquired device and grasping its physical structure. By using the inquiry command, the first storage controller 20, for example, can acquire the device name, device type, production number (product ID), LDEV numbers, various version information and the vendor ID from the second storage controller 40 (S4). The second storage controller 40 responds by sending the requested information to the first storage controller 20 (S5). The information extracted by the inquiry command is stored in shared memory. By using this stored information, the CHA can omit steps S3 through S5.

The first storage controller 20 registers the information acquired from the second storage controller 40 in a predetermined location of the mapping table Tm (S6). Next, the first storage controller 20 reads out the storage capacity of the storage devices 42 from the second storage controller 40 (S7). The second storage controller 40 replies to the inquiry from the first storage controller 20 with the storage capacity of the storage devices 42 (S8) and returns an acknowledgement (S9). The first storage controller 20 registers the storage capacity of the storage devices 42 in a predetermined location of the mapping table Tm (S10).

The above processing enables the construction of the mapping table Tm. When the input and output of data is carried out with the external storage devices 42 (external LUN, that is, the external LDEV), which were mapped to the VDEV of the first storage controller 20, an address conversion is carried out by referencing another table, which will be explained hereinbelow.

Data input/output between the first storage controller 20 and the second storage controller 40 will be explained by referring to FIG. 6 through FIG. 8. Firstly, the writing of data will be explained based on FIG. 6 and FIG. 7. FIG. 6 is a schematic view showing the process when data is written. FIG. 7 is illustrations showing the flow of processing in FIG. 6 as it relates to various tables.

The host 10 can write data to a logical volume (LDEV 102) provided by the first storage controller 20. For example, by virtue of procedures called zoning, whereby a virtual SAN subnet is set inside a SAN, and LUN masking, whereby the host 10 maintains a list of accessible LUN, the host 10 can be set such that it is only allowed to access a specified LDEV 102.

When the LDEV 102 to which the host 10 is attempting to write data is connected via a VDEV 101 to a storage device 31, which is an internal storage device, data is written in accordance with an ordinary process. That is, data from the host 10 is temporarily stored in cache memory 24, and from cache memory 24 is then stored in a predetermined address of a predetermined storage device 31 by way of a disk adapter 22. The disk adapter 22 translates the logical address to a physical address at this time. Further, in the case of a RAID constitution, the same data is stored in a plurality of storage devices 31.

Figure 6A:
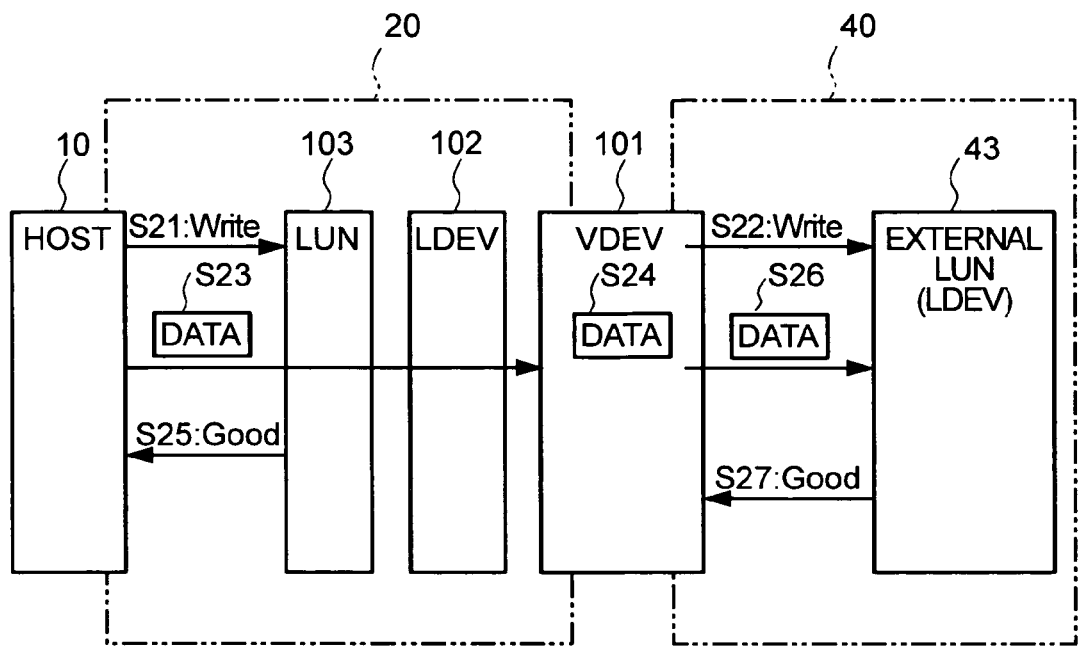
FIG. 6 is a conceptual view of when data is written to a virtualized external storage device treated as an internal volume.
Figure 6B:
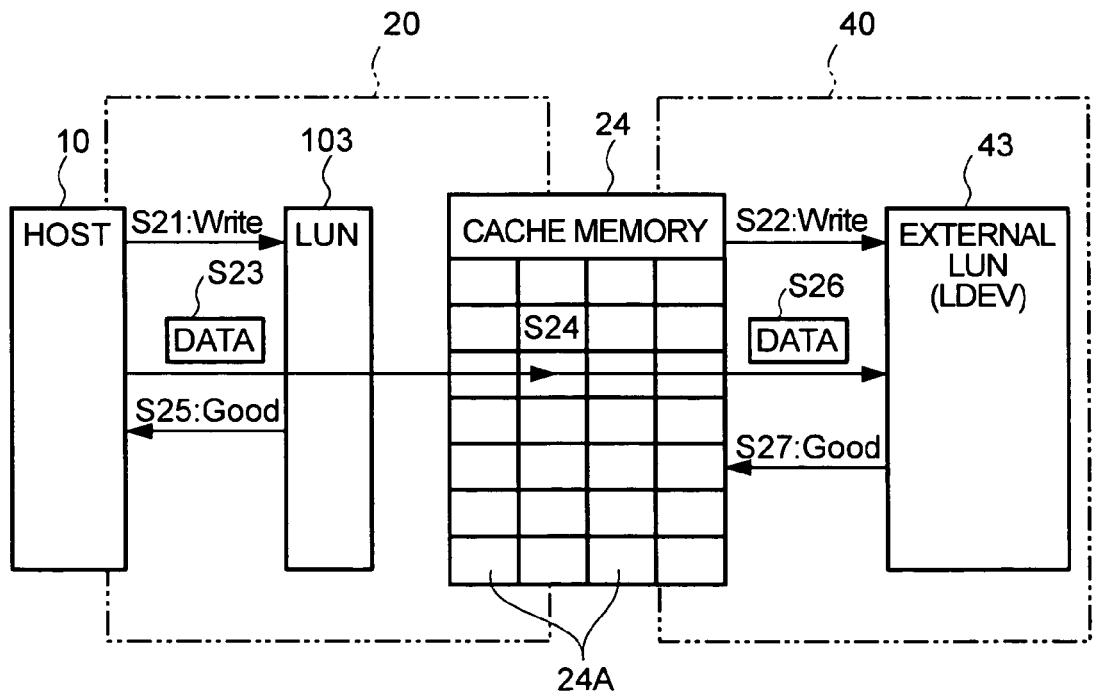
Figure 7:
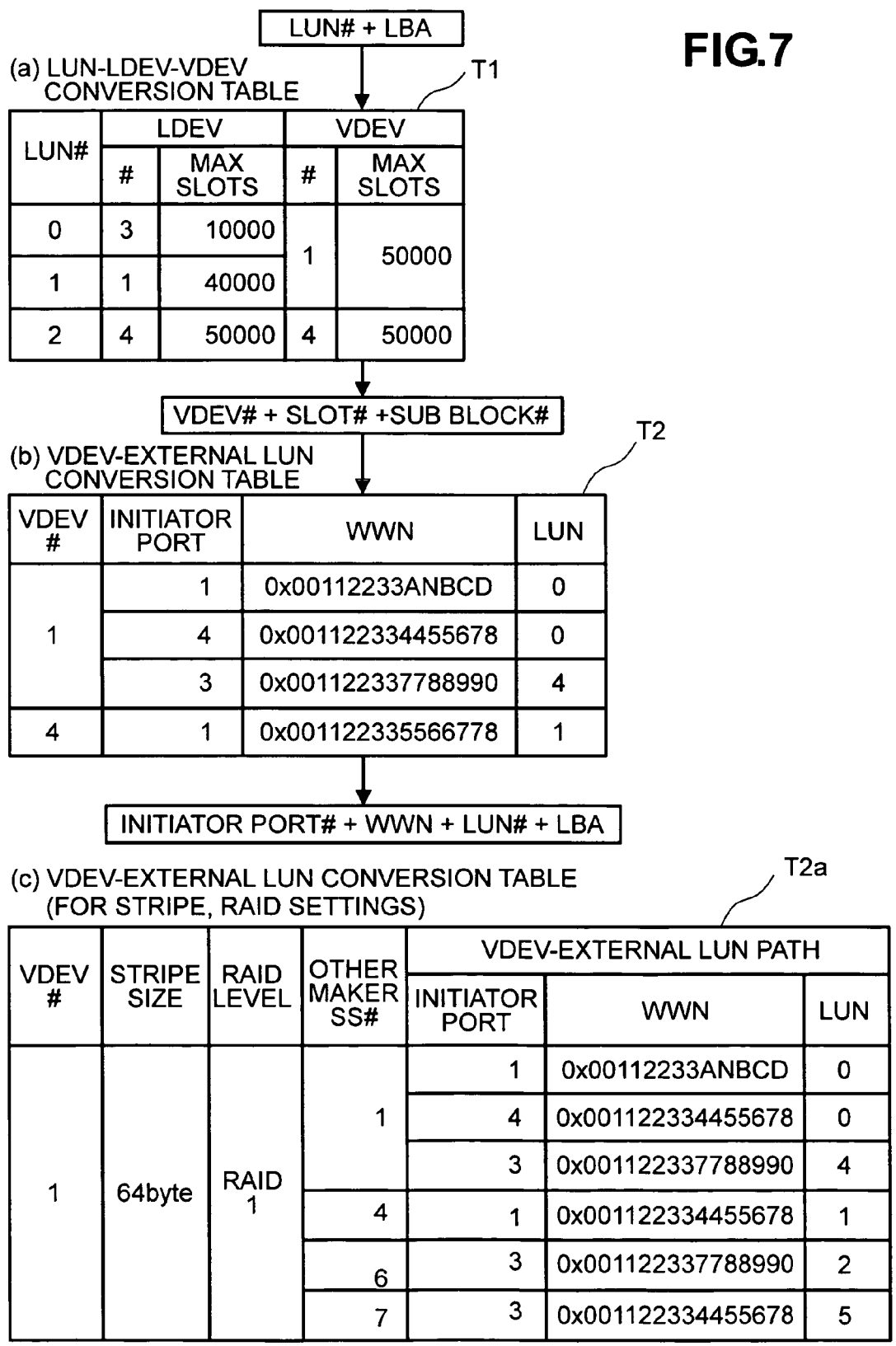
FIG. 7 is illustrations schematically showing the status of a write data address conversion.

By contrast, when the LDEV 102 to which the host 10 is attempting to write data is connected via a VDEV 101 to an external storage device 42, data is written in accordance with a flow such as that shown in FIG. 6. FIG. 6(a) is a flow diagram showing the storage hierarchy, and FIG. 6(b) is a flow diagram showing the way cache memory 24 is used.

The host 10 designates an LDEV number for specifying the write-destination LDEV 102, and WWN for specifying the communication port 21A for accessing this LDEV 102, and issues a write command (Write) (S21). When the first storage controller 20 receives a write command from the host 10, it generates a write command to send to the second storage controller 40, and sends it to the second storage controller 40 (S22). The first storage controller 20 generates a new write command by changing the write destination address information inside the write command received from the host 10 to conform to an external LDEV 43.

Next, the host 10 sends data to be written to the first storage controller 20 (S23). The data received by the first storage controller 20 is transferred to the external storage device 43 from the LDEV 102 via the VDEV 101 (S24) (S26). Here, at the time the data from the host 10 is stored in cache memory 24, the first storage controller 20 returns a write complete acknowledgement (Good) to the host 10 (S25). When the second storage controller 40 receives the data from the first storage controller 20 (or, when writing to the storage device 42 is finished), it sends a write-complete notice to the first storage controller 20 (S26). That is, the time at which the first storage controller 20 notifies write-complete to the host 10 (S25), and the time at which the data is actually stored in the storage device 42 are different (asynchronous). Therefore, the host 10 is released from the data write process before the data is actually stored in the storage device 42, and is able to carry out other processing.

As shown in FIG. 6(b), numerous subblocks 24A are provided in cache memory 24. The first storage controller 20 converts the specified logical block address from the host 10 to a subblock address, and stores the data in a predetermined location of cache memory 24 (S24).

The state in which data is converted by using various tables will be explained by referring to FIG. 7. As shown in the upper portion of FIG. 7, the host 10 specifies a LUN number (LUN#) and logical block address (LBA) for a predetermined communications port 21A, and sends the data. The first storage controller 20 converts the data (LUN#+LBA) inputted for LDEV 102 to data for VDEV 101 based on a first conversion table T1 shown in FIG. 7(a). The first conversion table T1 is a LUN-LDEV-VDEV conversion table for converting data for specifying an internal LUN 103 to VDEV 101 data. This table T1, for example, is constituted by making a LUN number (LUN#), an LDEV 102 number (LDEV#) and a maximum slots number corresponding to this LUN 103, and a VDEV 101 number (VDEV#) and maximum slots number corresponding to LDEV 102 correspond to one another. By referencing this table T1, the data (LUN#+LBA) from the host 10 is converted to data for VDEV 101 (VDEV#+SLOT#+SUBBLOCK#).

Next, the first storage controller 20 references a second conversion table T2 shown in FIG. 7(b), and converts the VDEV 101 data to data to be sent and stored for the external LUN (LDEV) of the second storage controller 40. In the second conversion table T2, for example, a VDEV 101 number (VDEV#), the number of an initiator port for sending data from this VDEV 101 to the second storage controller 40, a WWN for specifying a communications port 41 to which data is to be transferred, and a LUN number accessible via this communications port are made correspondent to one another. Based on this second conversion table T2, the first storage controller 20 converts the address data of the data to be stored to a format initiator port (target port) number +WWN+LUN#+LBA. Data for which the address data has been converted like this arrives at a specified communications port 41 from a specified initiator port via a communications network CN1. Then, the data is stored in a predetermined location of an LDEV accessible by a specified LUN 43. Since the LDEV is virtually built on a plurality of storage devices 42, the data address is converted to a physical address, and [the data] is stored at a predetermined address of a predetermined disk.

FIG. 7(c) shows another second conversion table T2a. This conversion table T2a is used when applying stripe or RAID to a VDEV 101 derived from the external storage device 42. The conversion table T2a is constituted by corresponding a VDEV number (VDEV#), stripe size, RAID level, a number for identifying the second storage controller 40 (SS# (storage system number)), initiator port number, WWN of the communications port 41, and LUN 43 number. In the example shown in FIG. 7(c), one VDEV 101 constitutes a RAID 1 using a total of four external storage controllers specified by SS# (1, 4, 6, 7). Further, the three LUN (#0, #0, #4) allocated to SS#1 are set in the same device (LDEV#). Furthermore, the volume of LUN#0 comprises an alternate path structure having two access data paths. Thus, in this embodiment, by constituting the VDEV 101 from a plurality of logical volumes (LDEV) that exist externally, it is possible to provide the host 10 [with a storage system] to which striping, RAID and other such functionality have been added.

The flow of processing when reading data from LDEV of the second storage controller will be explained by referring to FIG. 8. First, the host 10 specifies the communications port 21A, and sends a data read command to the first storage controller 20 (S31). When the first storage controller 20 receives the read command, it generates a read command for reading out the requested data from the second storage controller 40. The first storage controller 20 sends the generated read command to the second storage controller 40 (S32). The second storage controller 40 reads out the requested data from the storage device 42 in accordance with the read command received from the first storage controller 20, sends it to the first storage controller 20 (S33), and issues a notice to the extent that read-out has ended normally (S35). The first storage controller 20, as shown in FIG. 8(b), stores the data received from the second storage controller 40 in a predetermined location of cache memory 24 (S34).

The first storage controller 20 reads out the data stored in cache memory 24, and after carrying out address conversion, sends the data to the host 10 via the LUN 103 (S36), and issues a read complete notice (S37). In this series of processes at data read-out time, the conversion operation described together with FIG. 7 is carried out in the reverse order.

Figure 8A:
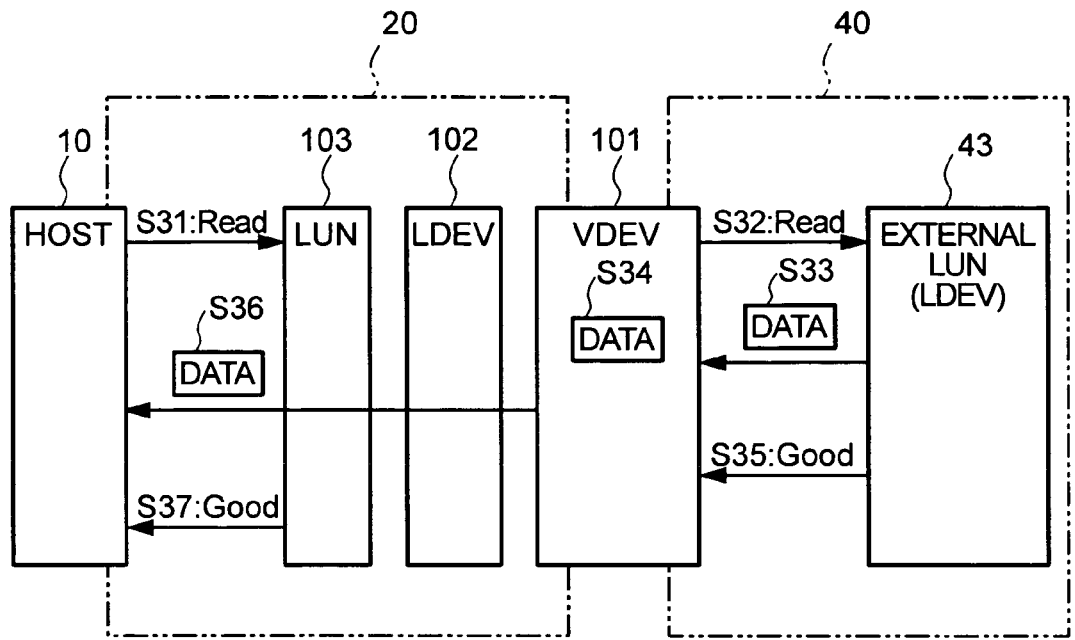
FIG. 8 is a conceptual view of when data is read from a virtualized external storage device treated as an internal volume.
Figure 8B:
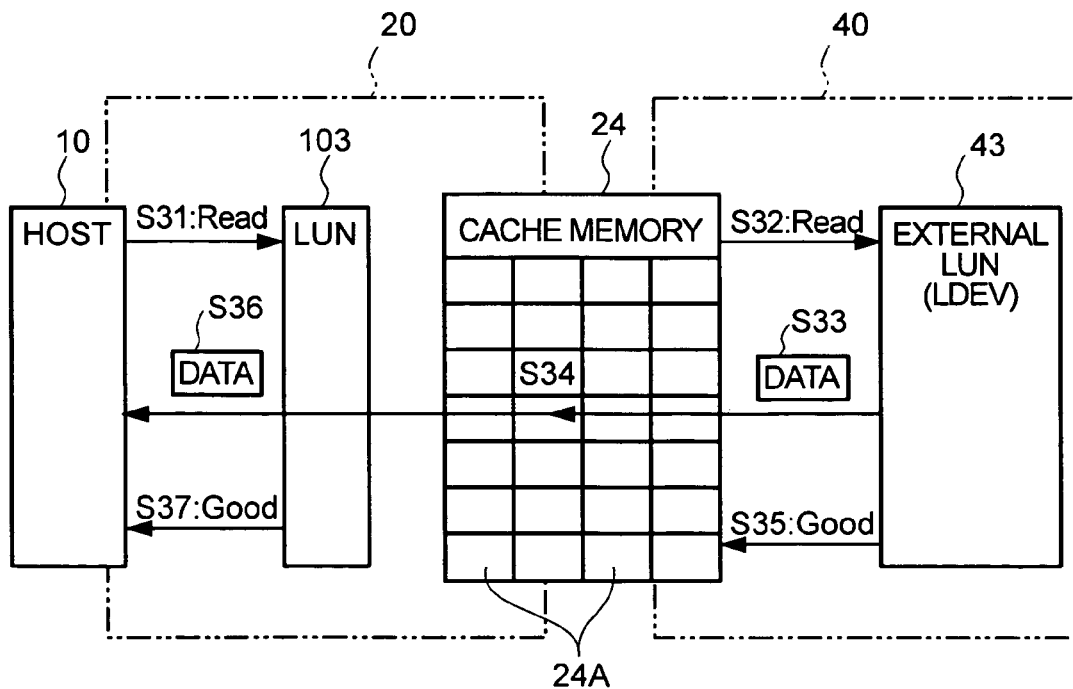

FIG. 8 shows data being read out from the second storage controller 40 in accordance with a request from the host 10, and stored in cache memory 24. However, it is not limited to this, and all or a portion of the data stored in an external LDEV can be stored in cache memory 24 beforehand. In this case, data can immediately be read out from cache memory 24 and sent to the host 10 in response to a read command from the host 10.

As described in detail hereinabove, in accordance with this embodiment, since the constitution is such that an external storage device 42 (more accurately, an external LDEV) is mapped to the VDEV of the first storage controller, an external logical volume can be treated like an internal logical volume, or an external storage device 42 can be treated like a virtual internal storage device. Therefore, even when the second storage controller 40 is an older model controller that is incapable of being connected directly to the host 10, the interposing of a new model first storage controller 20 makes it possible to reutilize the storage resources of the old model controller and provide them to the host 10 as the storage resources of the first storage controller 20. Thus, storage resources can be efficiently utilized by integrating an old storage controller with a new storage controller 20.

Further, when the first storage controller 20 is a high-performance, high-functionality new model controller, the low performance of the second storage controller 40 can be concealed by the high-performance computer resources (cache capacity and CPU processing speed) possessed by the first storage controller 20, and high-performance service can be provided to the host 10 by using a virtual internal volume that makes use of external storage devices 42.

In addition, an LDEV built on external storage devices 42 can be used, for example, by adding striping, expansion, partitioning, RAID and other such functionality. Therefore, the degree of freedom of utilization increases, and ease of use is enhanced more than when an external volume is mapped directly to a LUN 103.

Further, since an external logical volume can be used like an internal logical volume, the various functionality that the first storage controller 20 can use relative to the LDEV 102, which is an ordinary internal volume, can also be applied to a virtual internal volume. For example, MRCF, remote copying, CVS, LUSE and the like can be cited as available functions. Here, MRCF (Multiple RAID Coupling Feature) refers to functionality for enabling the creation of replicas of logical volumes without running the data through a host 10 (host-free replication). Remote copying refers to the functionality for synchronizing the storage content of a primary volume installed at a local site with that of a secondary volume installed at a remote site. CVS (Customizable Volume Size) is a variable volume function that makes it possible to set the size of a logical volume to an arbitrary size other than the standard size. LUSE (LU Size Expansion) refers to a LUN size expansion function for integrating a plurality of logical volumes into one logical volume and decreasing the number of host 10-recognizable LUN.

In addition, since a VDEV 101 built from an external logical volume can be attached to a plurality of LDEV 102, respectively, an alternate path structure can be achieved, and a load distribution effect can also be achieved by connecting a host 10 to the respective LUN 103 of each LDEV 102.

Further, since the alternate path structure of the second storage controller 40 is discerned by an inquiry command and mapped to the VDEV 101, the alternate path structure possessed by the second storage controller 40 can be inherited, and the redundancy of the storage system can be enhanced.

Figure 9:
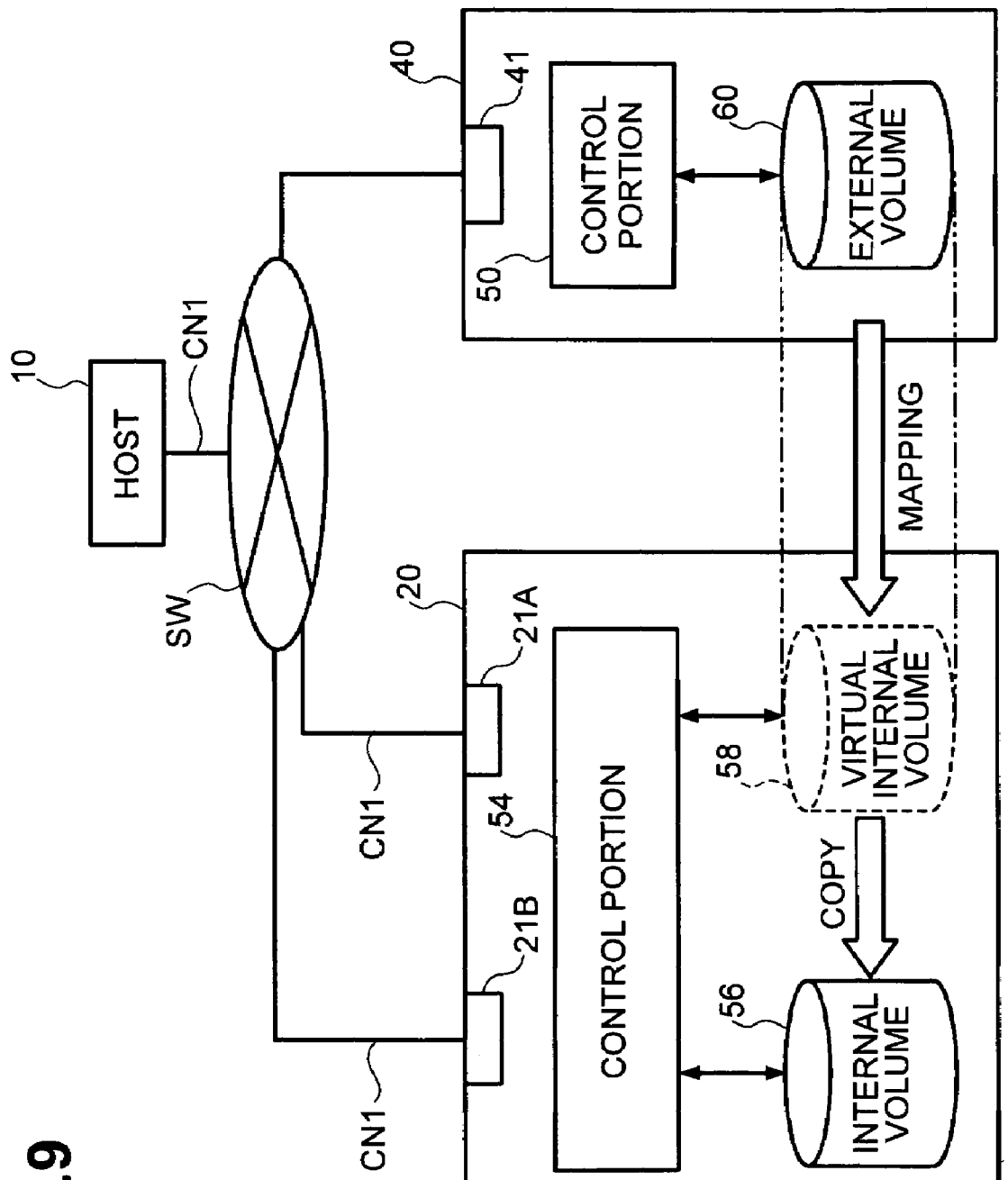
FIG. 9 is a functional block diagram of a storage control system for performing local copying between the volumes of a first storage controller and a second storage controller, having different logical configurations.

Next, a second embodiment of the present invention will be explained. FIG. 9 shows a storage control system that enables copying to be carried out between logical volumes for which the logical attributes determined by capacity and block length (emulation type) of the logical volumes differ from one another. The internal logical volume (external volume) 60 of the second storage controller 40 shown in FIG. 9 is mapped to a virtual internal volume 58 of the first storage controller 20 by virtue of the above-described mapping table. The controller portion 54 of the first storage controller recognizes the logical volume connected to the external port 21A as a logical volume (external volume) of an external controller (the second storage controller), and a virtual logical volume corresponding to the external logical volume can be set in the storage area of the cache memory inside the first storage controller 20.

Now, when the logical volume 60 of the second storage controller 40 is an emulation type called Open 3 (for example, storage capacity is 2.3 gigabytes, and the block length is 48K), and the internal logical volume 56 of the first storage controller is an emulation type called Open V, the storage capacity and block length of which can be set by the user, since the emulation types differed, it was not possible to carry out copying directly between the first and second storage controllers without going through the host 10. Accordingly, [this embodiment] is constituted such that copying can be carried out directly between these logical volumes without going through a host by building a virtual logical volume 58 in the first storage controller and going through this virtual logical volume. Furthermore, the applicants named the emulation types Open 3 and Open V for reasons of expediency.

As explained previously, since the virtual logical volume 58 is built using cache memory, it can be set such that the logical constitution coincides with the logical constitution of the internal volume 56 of the copy destination. Further, because the virtual logical volume is built on the cache, even if the logical constitution of the virtual logical volume and the logical constitution of the copy source volume 60 differ, it is possible to exchange data. The CHA 21 of FIG. 1 reads the data of the storage device corresponding to the copy source volume at the block length stipulated for the copy source volume 60, and stores this in cache memory 24. The DKA 22 reads out the data stored in cache memory 24 at the block length stipulated for the copy destination volume 56, and copies this locally to the physical area of the copy destination storage device. That is, by going through the virtual logical volume, as long as the storage capacity of the virtual logical volume is defined to match up with the storage capacity of the copy destination volume, the virtual logical volume can be copied locally to the copy destination volume even when the block length of the copy source volume differs from the block length of the copy destination volume.

Figure 10:
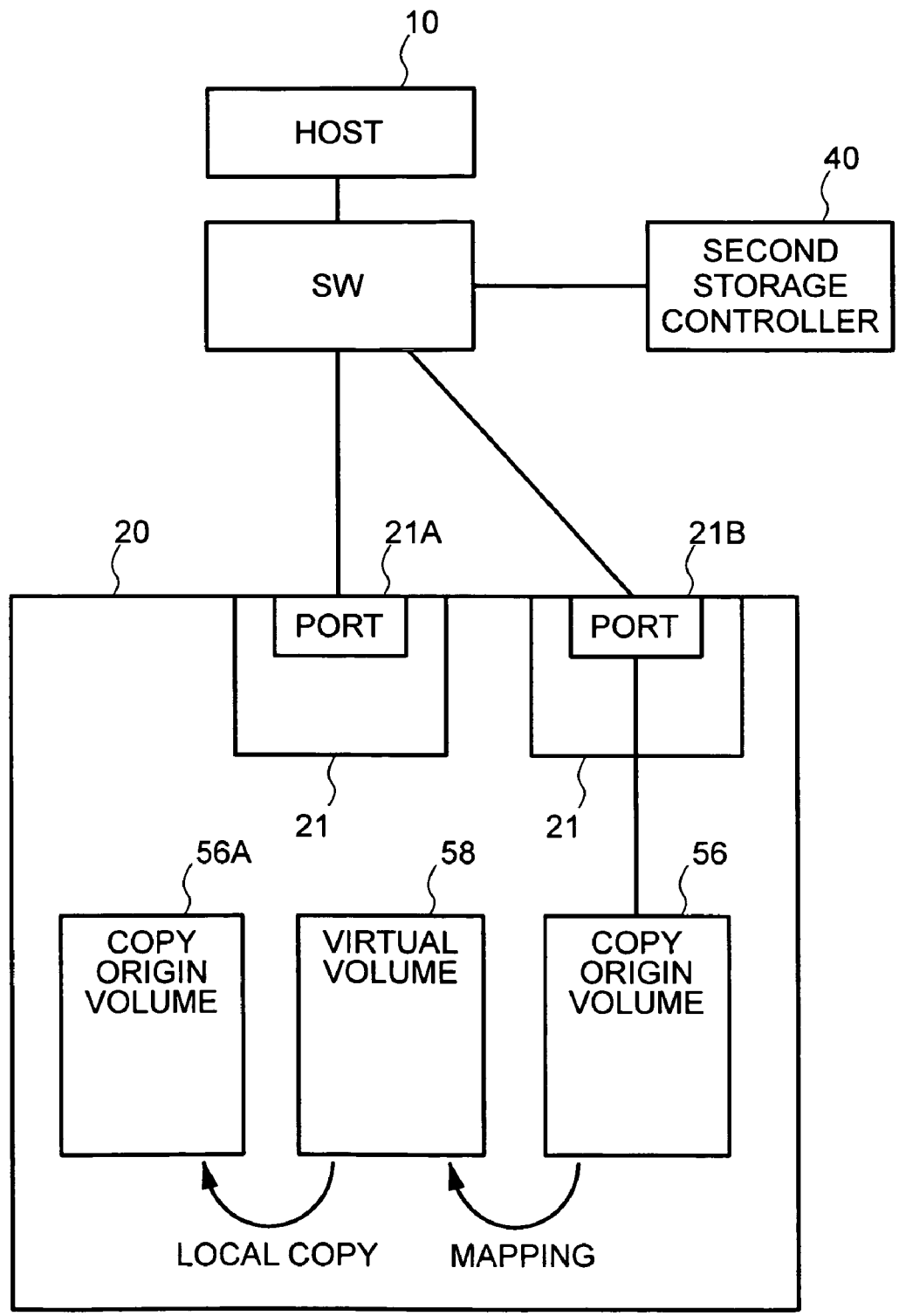
FIG. 10 is a functional block diagram of a storage control system for performing local copying between the volumes of a first storage controller, having different logical configurations.

As shown in FIG. 10, by accessing the target port 21B of its own controller via the switch SW from the external port 21A, the CHA 21 can also make the volume that constitutes the mapping origin of the virtual volume (the copy source volume) 56 a volume inside its own controller 20. The SVP of the first storage controller 20 can form a virtual logical volume for a volume to which a path is defined from the target port 21B of its own controller via the external port 21A and switch SW. Thus, [the SVP] can define a virtual volume on the internal volume of its own controller and migrate data between volumes, whose previously described emulation types differ, inside its own controller. The local copy from the copy source volume 56 to the copy destination volume 56A via the virtual volume 58 is managed by the local copy management table. The mapping between the copy source volume and the virtual volume, and the mapping information from the virtual volume to the copy destination volume is also included in the management table. The SVP (23 of FIG. 1) management client executes the local copy between the two volumes by referring to the management table. This management table is stored in shared memory 25 (FIG. 1).

FIG. 11 is a diagram showing one example of a local copy management table. The copy management table, for example, can be constituted by making information for specifying a copy origin LU, information for specifying a copy destination LU, and the current copy status correspondent. As examples of copy status, "pair formation" and "pair partition" can be given.

Here, "pair formation" status is a state wherein a complete copy is made from a copy source volume to a copy destination volume. "Pair partition" status is a state wherein a copy source volume and a copy destination volume are partitioned from one another. "Resynchronization" status is a state wherein a copy pair is formed by once again synchronizing the storage contents of a copy source volume and copy destination volume from a state wherein the two volumes were partitioned.

Figure 12:
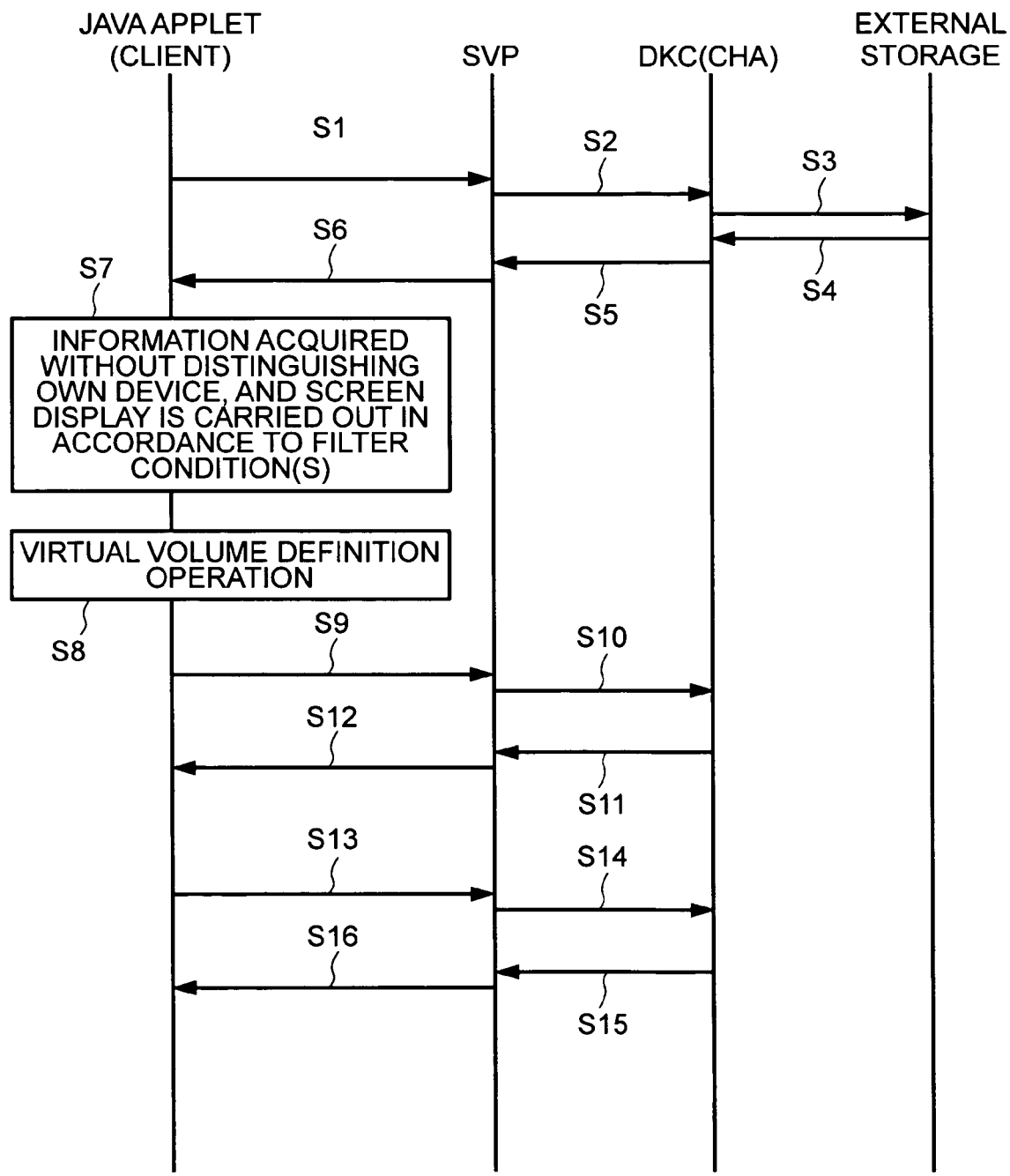
FIG. 12 is a schematic showing the flow of a processing operation for local copying between volumes having different logical configurations.

FIG. 12 is a schematic showing the flow of a local copy operation. The management client (JAVA™ applet) executes the above-described discovery as shown in FIG. 3. The management client displays on a display screen an internal logical volume without distinguishing whether it is a logical volume of its own storage controller or a logical volume of an other storage controller (S1 through S6). The management client is constituted such that it can cancel the above-described filtering function of the management program at this time, and recognize an internal logical volume of its own controller in the same manner as an external logical volume. The management client user selects, on the basis of a screen display, a logical volume, which has been made correspondent to a virtual logical volume, and executes definition processing for this virtual logical volume (S7 through S9).

Figure 14:
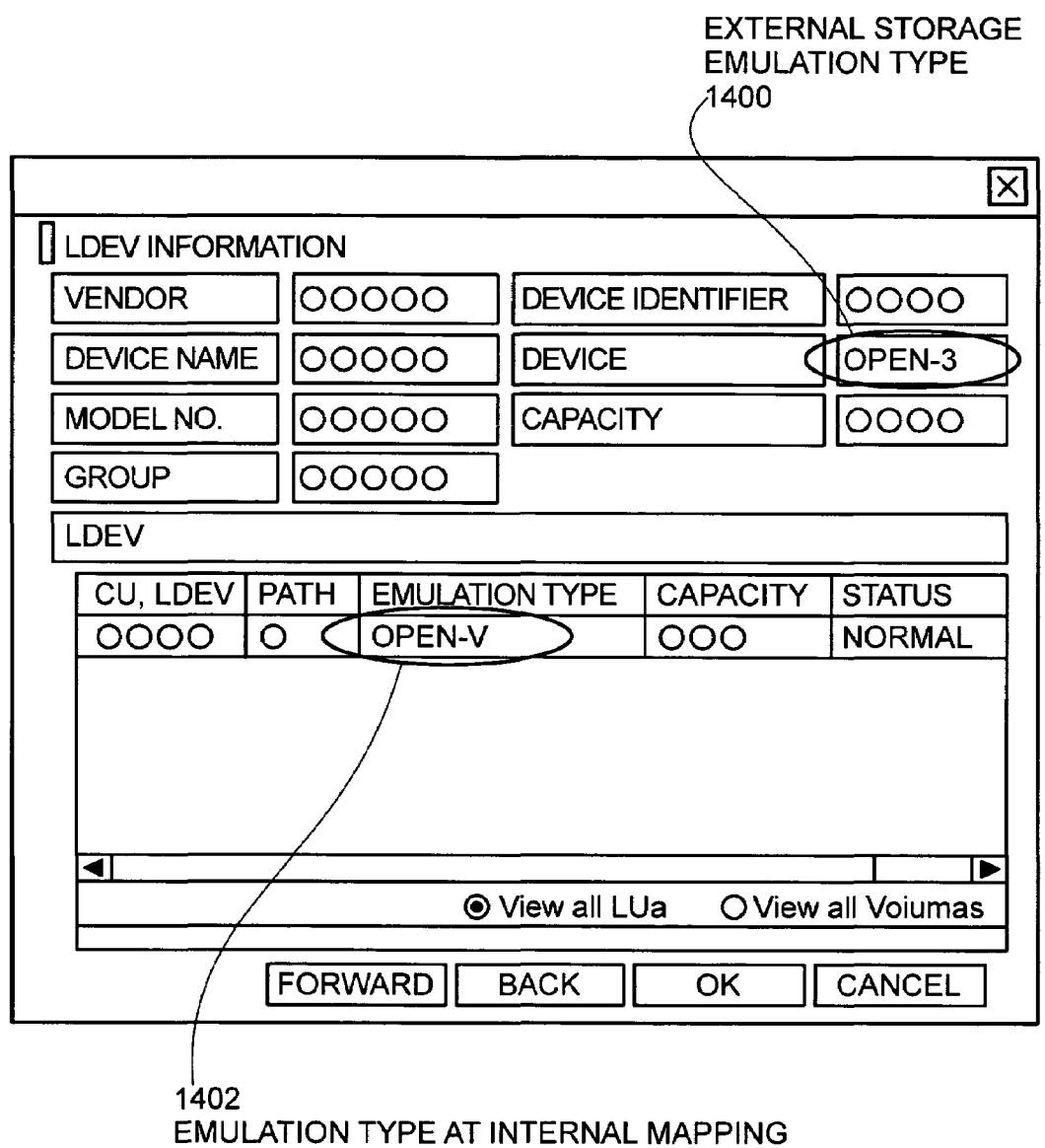
FIG. 14 is an example of the same management screen.

At this time, the management client references shared memory, reads the information of the copy destination volume, and makes the emulation type of the virtual volume the same as the emulation type of the copy destination volume. When the copy destination volume is not defined, the management client executes build processing for a copy destination logical volume to include an emulation type definition before executing definition processing for the virtual logical volume. Thereafter, it carries out processing (S10 through S12) for building a virtual logical volume in the first storage controller. When the management client instructs the SVP to [carry out] the above-mentioned local copy (S13), the SVP issues a copy command to the CHA 21 (S14) (Refer to FIG. 1). Furthermore, FIG. 14 is the screen displayed by the management tool of the management client for specifying a copy destination volume. [Reference numeral] 1400 indicates the emulation type of the copy source volume inside the external storage controller, and [reference numeral] 1402 indicates the emulation type of the copy destination volume of the first storage controller. The user can use the management tool to set the emulation type of the virtual volume by comparing the emulation types of the two volumes.

The CHA issues the above-mentioned local copy end command to the SVP (S15), and the management client ends the local copy (S16). Furthermore, in FIG. 10, the management client can define a path from the target port 21B to the volume. Therefore, the management client can define a path from the target port 21B to the virtual volume 58 such that the host 10 cannot reference the virtual volume 58.

The SVP management client can remove the logical volume constituted inside the storage controller after copying has ended. For example, it removes the set virtual volume. At this time, the SVP management client determines whether or not data that is not mirrored in the logical unit to be removed is on the cache, and when unmirrored data exists on the cache, the DKA 22 (see FIG. 1) stores the unmirrored data in the storage device by way of the logical unit to be removed.

The embodiment described hereinabove was explained such that a filtering operation and local copying were executed by the SVP management client, but the CHA or DKA processors inside the storage controller can also be constituted so as to carry out these operations.

What is claimed is:

1. A storage control system having a first storage controller and a second storage controller connected communicably with each other which carries out data processing in accordance with a request from a host, wherein said first storage controller comprises:

a plurality of storage devices, a plurality of first logical volumes to be configured from said plurality of storage devices and accessed from said host, a data controller configured to control data processing between said host and said plurality of first logical volumes, a port capable of connecting a first logical volume of said plurality of first logical volumes of said first storage controller and a second logical volume of a plurality of second logical volumes of said second storage controller, a channel interface unit configured to provide said first logical volume as a virtual logical volume to said host and manage a request from said host to said second logical volume of said second storage controller via said virtual logical volume, a memory including mapping information between said first logical volume and said second logical volume, and a management client unit configured to execute processing for setting said virtual logical volume, wherein when said management client unit sets said virtual logical volume, said channel interface unit acquires information of both said plurality of first logical volumes of said first storage controller and said plurality of second logical volumes of said second storage controller by referring to said memory and sends said information to said management client unit, said management client unit executes filtering processing for specifying said first logical volume from said plurality of first logical volumes based on said information, and displays said plurality of first logical volumes without said first logical volume on a screen of said first storage controller, and wherein said management client unit is configured so as to execute discovery processing for extracting logical volumes capable of being connected to said port as candidates for said virtual logical volume, and filtering processing for removing a logical volume of said first storage controller from this group of candidates.

2. The storage control system according to claim 1, wherein said management client unit is configured such that said virtual logical volume cannot be set in a logical volume of said first storage controller.

3. The storage control system according to claim 1, wherein said management client unit is configured such that said virtual logical volume can be set in a logical volume of said second storage controller.

4. The storage control system according to claim 1, wherein said management client unit operates so as to display on a display screen said logical volumes constituting the candidates for said virtual logical volume, based on the results of said filtering processing.

5. The storage control system according to claim 4, wherein said management client unit is configured to display on said display screen logical volumes of said first storage controller as candidates for correspondent destination of said virtual logical volume.

6. The storage control system according to claim 1, wherein said management client unit comprises:
   a management program of a client computer connected to said data controller, and said filtering processing and said discovery processing are realized on this program.

7. The storage control system according to claim 1, further comprising:
   a switch circuit for selectively connecting said first logical volume of said first storage controller and said second logical volume of said second storage controller to said port.

8. The storage control system according to claim 1, wherein said management client unit is configured such that said filtering processing can be disabled.

9. The storage control system according to claim 1, wherein said information acquired by said channel interface unit includes information that identifies said first storage controller and said second storage controller.

10. A storage control system having a first storage controller and a second storage controller connected communicably with each other which carries out data processing according to a request from a host,
   wherein said first storage controller comprises:
   a plurality of storage devices,
   a plurality of first logical volumes configured from said plurality of storage devices and configured to be accessed from said host,
   a data controller configured to control data processing between said host and said plurality of first logical volumes,
   a port capable of connecting a first logical volume of said plurality of first logical volumes of said first storage controller and a second logical volume of a plurality of second logical volumes of said second storage controller, and
   a discovery controller for executing a discovery operation which extracts information of logical volumes connected to the port and displays extraction results on a screen, and
   wherein the discovery controller is configured to be able to process a predetermined logical volume from among the extracted logical volumes so as not to be displayed on a screen,
   a channel interface unit configured to provide said first logical volume as a virtual logical volume to said host and manage a request from said host to said second logical volume of said second storage controller via said virtual logical volume,
   a memory including mapping information between said first logical volume and said second logical volume, and
   a management client unit configured to execute processing for setting said virtual logical volume,
   wherein upon receipt of a request to set a virtual logical volume, said first storage controller extracts, as said information, information of both said first logical volumes of said first storage controller and said second logical volumes of said second storage controller, and said discovery controller executes filtering processing for specifying one of said first and second logical volumes based on said extracted information and displays said first and second logical volumes without the specified one of said logical volumes on a screen of said first storage controller, and
   wherein said management client unit is configured so as to execute discovery processing for extracting logical volumes capable of being connected to said port as candidates for said virtual logical volume, and filtering processing for removing a logical volume of said first storage controller from this group of candidates.

11. The storage control system according to claim 10, wherein the specified one of said logical volume not displayed on the screen is a logical volume of said first storage controller.

* * * * *